United States Patent Office 3,346,265
Patented Oct. 10, 1967

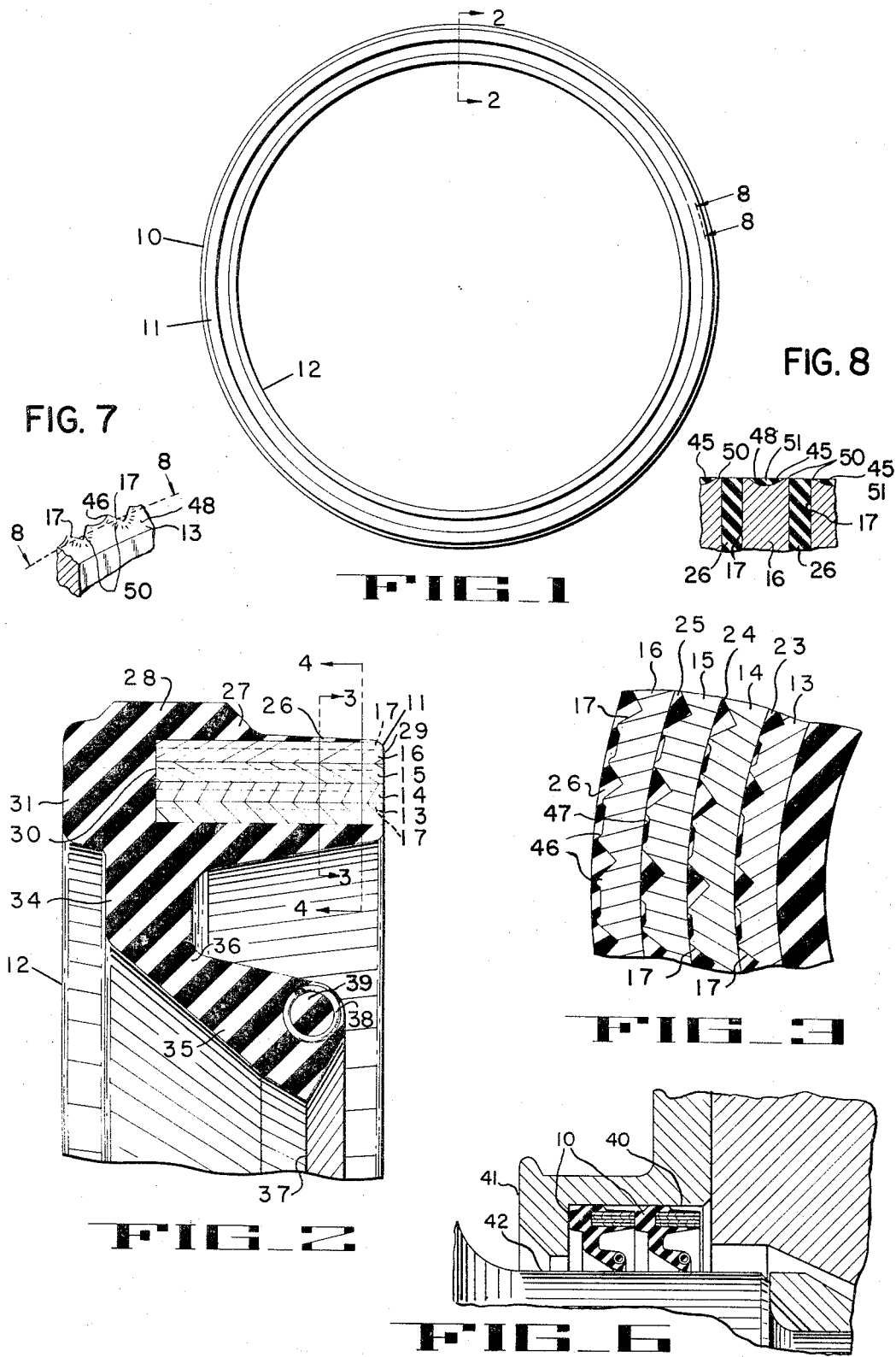

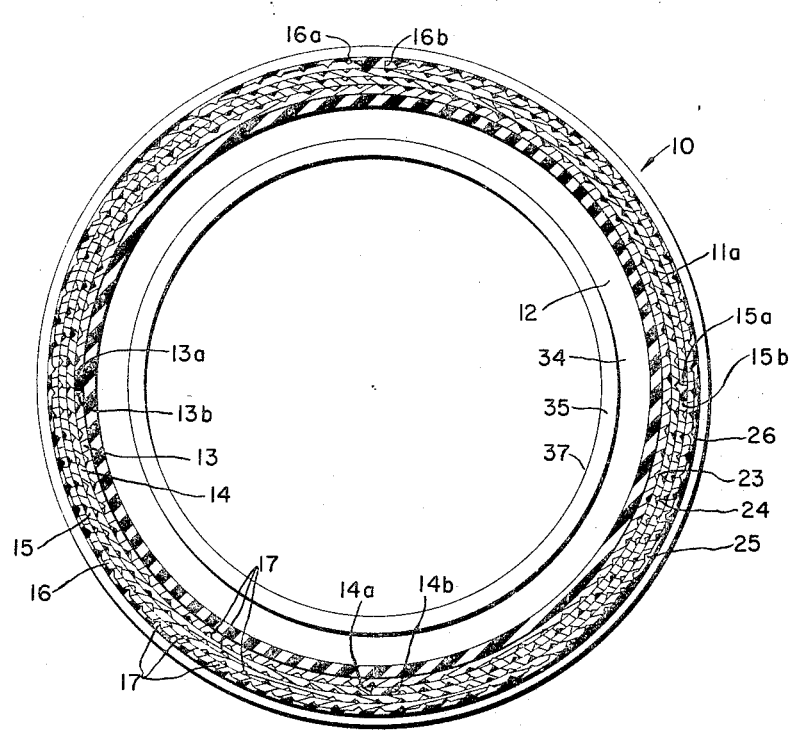
FIG_4
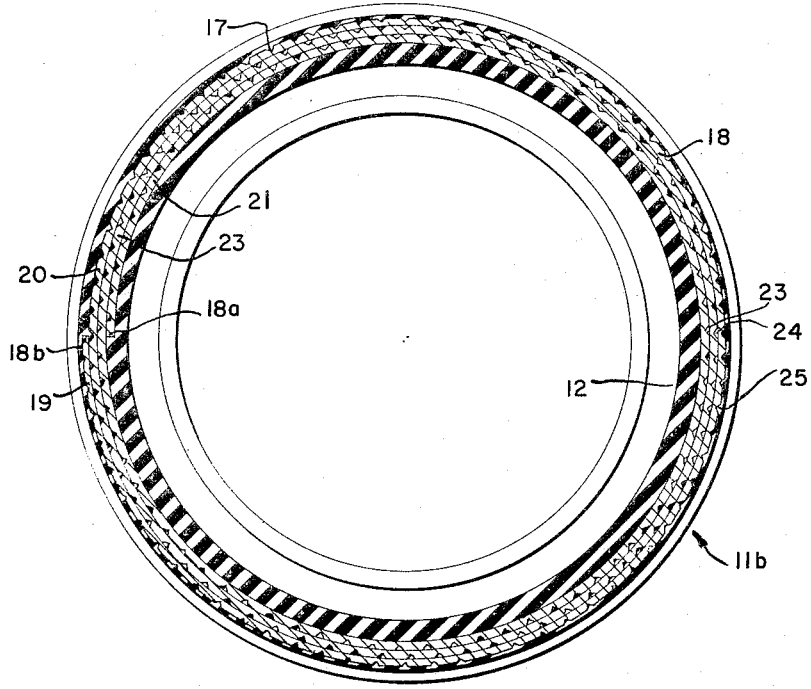
FIG_5

3,346,265
ELASTOMERIC OIL SEAL HAVING A LAMINATED METAL REINFORCING MEMBER
George D. Rhoads, Redwood City, and Robert N. Haynie, Los Altos, Calif., assignors to Federal-Mogul Corporation, a corporation of Michigan
Filed June 8, 1964, Ser. No. 373,212
9 Claims. (Cl. 277—152)

This invention relates to improvements in oil seals and in methods for making them. More particularly, it relates to improvements in shaft seals of the lip type.

Some machinery requires very large-diameter seals and subjects them to very rough treatment. For example, steel mill roll necks require large-diameter, heavy-duty seals, and these are usually installed by driving them into the housing bore with a sledge hammer; moreover, these seals are removed from and reinstalled on the shaft almost every day. Few seal structures can withstand the very rough handling which these seals receive. For example, seals having the conventional radially flanged cylindrical metal case or seal-reinforcing member have usually been destroyed within a short time by elastomer breakage, usually near the terminal end of the radial flange.

In addition, the cost of making such large seals is great, because they are not made in large enough quantities to justify the expensive type of machinery used for shaping the smaller cases that are sold in larger volumes; so these large cases have had to be hand formed.

The present invention provides a very rugged seal suitable for these large-diameter roll-neck applications. Great strength and rigidity is achieved, along with the needed flexibility and reliability of the seal lip. Moreover, the seal of this invention is less expensive to fabricate than are hand-formed outer cases.

In shaft seals of this general type it has been desirable to provide a garter spring for urging the lip against the shaft, but trouble has often followed because the spring has often popped out of the groove that was supposed to hold them, especially when the seals were installed by sledge hammer blows, and the loose spring has not only left the seal lip able to lose shaft contact and to leak but has frequently caused damage to the bearings.

In the present invention the spring is molded directly into the rubber adjacent the sealing lip edge. As a result, it cannot escape from the seal, and also the needed rigidity is applied at all times. Preferably, this spring is bonded to the rubber in which it is encased. Moreover, it is molded in its fully closed position, so that it can be stretched outwardly by the shaft but cannot be forced further inwardly, whether by oil or gas pressure or by other forces.

Other objects and advantages of the invention will appear from the following description of some preferred embodiments thereof.

In the drawings:

FIG. 1 is a reduced view in end elevation of a radial lip type of shaft seal embodying the principles of the invention.

FIG. 2 is an enlarged view in elevation and in section taken along the line 2—2 in FIG. 1.

FIG. 3 is a further enlarged view in section taken along the line 3—3 in FIG. 2.

FIG. 4 is a view on a larger scale than FIG. 1 and on a smaller scale than FIG. 2, taken along the line 4—4 in FIG. 2.

FIG. 5 is a view similar to FIG. 4 of a modified form of the invention.

FIG. 6 is a fragmentary view in elevation and in section of an installation of two of the seals of FIGS. 1–4.

FIG. 7 is a fragmentary view in perspective of the end edge of one of the metal strips, showing how the keep knurls give rise to endwise projections.

FIG. 8 is a fragmentary view in section taken along the line 8—8 in FIG. 1, at the position also shown at 8—8 in FIG. 7, showing how the endwise projections provide passages for the flow of elastomer.

FIGS. 1–4 show a rotary shaft seal 10 having a metal reinforcing assembly 11 to which is bonded a molded elastomeric member 12 which provides the sealing lip as well as some other portions of the seal.

The reinforcing assembly 11 is unique in that it is made from one or more indented metal strips. For example, as shown in FIG. 4, an assembly 11a may be made from four strips 13, 14, 15 and 16 of steel, each of which has spaced-apart deep knurls 17 running widthwise across the strip. Each successive strip 13, 14, 15 and 16 is successively longer than its predecessor and is formed into circular shape to provide a series of circles of increasing diameter, and these are nested concentrically in such a manner that the elastomer 12 can flow in between them through the passages provided by the knurls 17. The strip ends 13a and 13b, 14a and 14b, 15a and 15b, 16a and 16b are preferably staggered to distribute them evenly around the seal.

Alternatively, as shown in FIG. 5, an assembly 11b may be made from one long strip 18 which is spirally wound from an inner end 18a and to an outer end 18b to provide several practically concentric plies 19, 20, and 21, and again knurls 17 are used to provide elastomer passages. In place of knurls, dinks or other types of recessing that provide for elastomer passage between and bonding to the plies 19, 20, and 21 or to the strips 13, 14, 15 and 16, may be used.

During molding the elastomer 12 fills with solid elastomer portions 23, 24 and 25 the spaces provided by the dinks or knurls 17 in between the strips 13, 14, 15 and 16. The filling and bonding of the elastomer portions 23, 24 and 25 to the metal strips 13, 14, 15 and 16, or plies 19, 20, and 21 makes the supporting assembly 11 quite rigid, by virtue of the several bonded-together laminations of metal and elastomer.

In addition, the elastomer is shaped by the mold to provide a thin covering 26 over an entry portion of the outer periphery of the outermost metal ring 16 or ply 19, succeeded by a tapered lead-in portion 27 and a larger diameter outer elastomer cylindrical portion 28. This structure enables the seal to be installed in bores whose size varies over a wide range of tolerances from its nominal size when the bore is deeply scratched and has burrs, and it helps to maintain the seal firmly in place there. The axially inside face 29 may be bare or may have a tight flash covering. On the axially outside face 30 of the metal assembly 11 is a bumper portion 31 of elastomer which is engaged by the hammer or other installing tool and protects the seal 10 during installation when it is hammered in. As a result of this structure, the seal 10 can stand a great deal of abuse.

The elastomeric member 12 extends radially inwardly from the rigid retaining assembly 11, having a radially extending portion 34 which is connected to an integral lip body 35 by a thin flex section 36, where the lip 35 flexes at a particular controlled location. This control helps to prevent seal damage during installation of the seal and also enables the lip section 35 to follow shaft runout properly. The lip body 35 is provided with a sharp lip edge 37 and also is provided with a molded-in spring 38, preferably a coil spring of steel treated with bonding cement to assure its bonding to the elastomer, thereby providing rigidity and strength and aiding in confining the flexing strictly to the flexing neck 36.

Preferably, the spring 38 is normally fully closed, being molded in place that way, for an open-wound spring is difficult to control. In some large seals which are subjected to very rugged use it may be desirable for the seal to be more flexible and less rigid; a spring structure that gives more easily may be obtained by treating the spring in such a way that it will not bond to the elastomer, this being accomplished in accordance with the practice disclosed in patent application Serial No. 351,278, filed March 9, 1964. During molding the spring 38 is not only embedded in the rubber of the lip body 35, but is also filled with a core 39 of rubber which helps it to provide strong support for the sealing lip 37. In accordance with the invention in application Serial No. 351,278, this spring is accurately located axially and radially, and is fully supported to make sure that it retains its roundness.

The rubber-covered seal of this invention is enabled by its thick outer peripheral elastomeric portion 28 to be press fit into the bore, to provide good seal retention and to seal the outer periphery. The small diameter noncritical lead-in portion 26 which is practically a metal periphery, leads to the portion 28 by the large tapered angle 27, so that the seal 10 is easily inserted into a bore. The lead-in portion 26 helps the seal 10 to fit into a bore substantially smaller than the outer periphery of the outer portion 28 by giving a space into which the elastomer can flow. The thin rubber coating 26 on this lead-in portion of the outer periphery protects the metal against corrosion, while its thinness enables location of the metal parts during the molding operation; chaplets may be provided in the mold or on the strips themselves, if desired, to accomplish this.

The seal toe area 29 may, as shown, be given corrosion protection by tight flash or a rubber covering 45 that also provides channels by which the elastomer flows around both ends of the strips 13, 14, 15, 16 and into the grooved passages provided by the knurled indentations 17. This latest point may need some further explanation. As shown in FIG. 3, the forming of the knurls 17 means that the metal formerly occupying the space that becomes the knurl must be displaced, and this results in the raised projections 46 on each side of the knurl 17. It will be noted that the presence of these projections 46 also provides thin channels 47 into which elastomer flows. Similarly, as shown in FIG. 7, at the end faces 48 of the metal strips which form the metal portion of the surface 29, the metal flows to form endwise projections 50 that project beyond the face 48 a short distance. Then in the mold, the elastomer flows through channels 51, which it fills and which it uses as passages to get into the channels 17 and 47, thereby improving the efficiency of the mold so far as the filling of the spaces between laminations is concerned. This rubber covering provided at the channels 51 and in the end portions of the grooves 17 helps to prevent corrosion and also provides a resilient bumper-like surface which protects the seal during its installation. This rubber covering on the face 29 also serves to bind the metal strips 13, 14, 15 and 16 together.

The reinforced metal strip construction of FIG. 5 with its several continuous coils 19, 20, 21 and 22 of a single metal strip 18, and that of FIG. 4 with its several separate strips 13, 14, 15 and 16 of metal, are combined with the elastomeric interleaving 23, 24, 25 to give a much more rigid section than even a single piece of steel of the same total thickness would give, and the thin strips are much easier to handle than one solid metal strip would be, which would be most difficult to bend into the proper shape. The elastomer interleaving securely bonds the strips and coils together and unites them and the elastomeric body 12 into one rigid structure during a single molding operation. The single cylindrical wall of the conventional outer case is also not nearly as rigid axially as are the plural cylindrical walls of the present design, nor is it as rigid radially as is the present seal with its lamination of reinforcing strips and elastomer.

The seal 10 is much less subject to installation damage than prior art seals, because the metal reinforcing portion 11 of the seal is massed in its outer diameter portion and has no radially extending projections subject to damage. Since there is no radial flange there is no bending of such a flange during installation with resultant damage to the seal. Similarly, molding of the spring 38 into the lip body 35 provides additional installation security. The rubber pad 31 on the heel of the seal accommodates sledgehammer-type seal installation without damage to the seal. This same area may be molded so as to carry molded-in identification by the name and number of the seal so that the customer can identify the proper seal.

The combination of the molded-in spring 38 and the rubber 35 and 39, the rigid laminated metal strip reinforcement 11, and the flexing section 36 provides greater and better controlled lip flexibility because there is no radial metal flange. There is also inherent sealing element stability and spring retention.

It will be noted that the seal 10 has an exceptionally smooth contour, affording little opportunity for damage to the seal either on installation or withdrawal. Since the elastomer is softer than hard rubber seals, installation also becomes easier.

After molding, the inner periphery of the sealing element may be ground, in accordance with patent application Serial No. 225,586 filed September 24, 1962, to provide a sharp corner 37 which assures excellent sealing and also to provide a nonmolded subcutaneous surface that retains an oil film under the lip 37 for proper lubrication and long life. If desired, the conventional hat trim can be used, but grinding is usually less expensive, especially since the desired sealing surface angle is easily ground to the unit cross-section instead of to a given diameter, because of the stability imparted by the spring 38 in the rubber section 35. The spring 38 also reinforces the sealing lip 37 and prevents the lip 37 from being torn by improper installation practice.

FIG. 6 is an installation of two seals 10 between a bore 40 of a housing 41 and a shaft 42, showing how the seals look in one exemplary installation.

To those skilled in the art to which this invention relates, many additional changes in construction and widely differing embodiments of the invention will suggest themselves without departing from the spirit and scope of the invention as defined in the claims.

What is claimed is:

1. A radial-lip rotary shaft seal of the type having a generally cylindrical metal reinforcing member and an elastomeric member bonded to said reinforcing member at a body portion and providing a sealing lip joined to said body portion by a flexible neck, characterized by said metal reinforcing member having a plurality of radially successive laminations having recesses extending axially of said seal and spaced apart longitudinally therein with elastomer of said sealing member filling said recesses between successive laminations and rigidifying the structure, the radial thickness of said metal reinforcing member comprising successive alternate layers of metal and elastomer, whereby thin metal stock in each lamination combines with alternate layers of elastomer to build up a total radial thickness more rigid than the total metal thickness involved.

2. The seal of claim 1 wherein said reinforcing member is provided by a series of separate metal strips each formed into a circle with the meeting ends of the different laminations staggered from each other.

3. The seal of claim 1 wherein said reinforcing member is provided by a single spiral wound metal strip.

4. The seal of claim 1 wherein said elastomeric member covers the inner and outer cylindrical peripheries of said reinforcing member and at least one radial surface thereof.

5. The seal of claim 4 having a bumper portion of elastomer forming part of said body portion directly supported by said metal reinforcing member on one said radial surface thereof.

6. The seal of claim 4 wherein the outer said cylindrical surface has a thin elastomer covering providing a lead-in portion, a thick elastomer covering providing a bore-engaging portion, and a tapered frusto-conical portion connecting said lead-in portion to said bore-engaging portion.

7. The seal of claim 1 wherein said elastomeric member has a portion extending in radially from said reinforcing member and body portion, a lip body joined thereto by said neck, said neck being narrow and flexing, and a garter spring embedded in and molded to said lip body.

8. The shaft seal of claim 1, wherein the recesses are knurls and comprise grooves bordered by raised projections that provide additional shallow passages in between adjacent grooves, said grooves and passages both being filled with elastomer.

9. The shaft seal of claim 8 wherein at the end edges, the knurls have endwise projections and wherein at one face said projections provide elastomer filled channels in one end face of said seal, covering said face with elastomer and binding the metal parts together.

References Cited

UNITED STATES PATENTS

| | | | |
|---|---|---|---|
| 2,249,141 | 7/1941 | Johnson | 277—152 |
| 2,736,586 | 2/1956 | Riesing | 277—153 |
| 2,816,784 | 12/1957 | Stucke | 277—152 |
| 3,066,387 | 12/1962 | Herbst | 264—274 X |

FOREIGN PATENTS 712,847  8/1954  Great Britain.

LAVERNE D. GEIGER, *Primary Examiner.*

J. MEDNICK, *Assistant Examiner.*